(No Model.)
S. P. TALLMAN.
STOCK CAR.
No. 274,991. Patented Apr. 3, 1883.
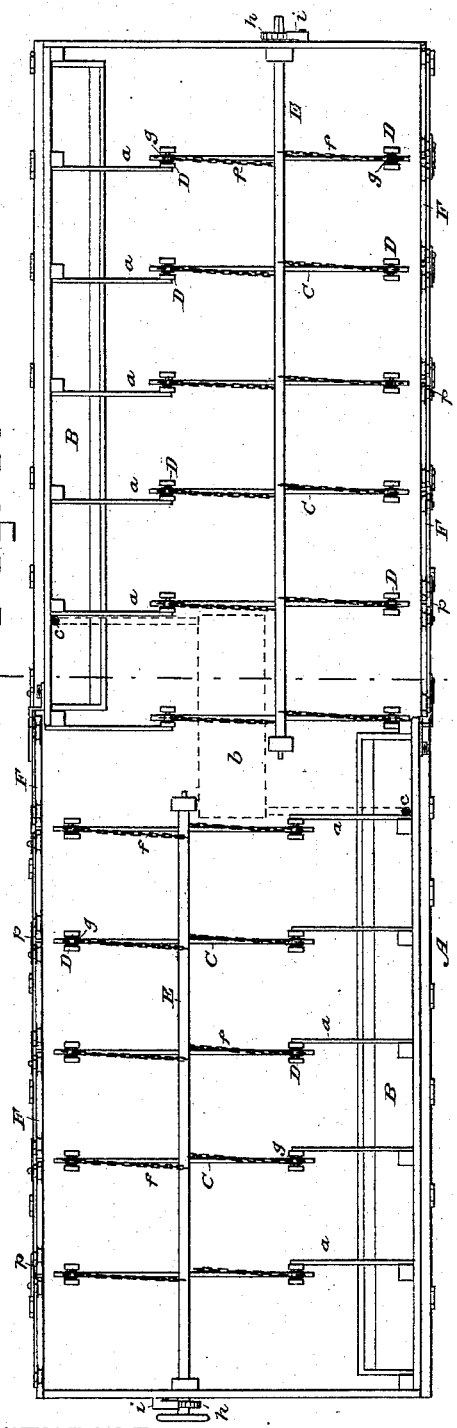
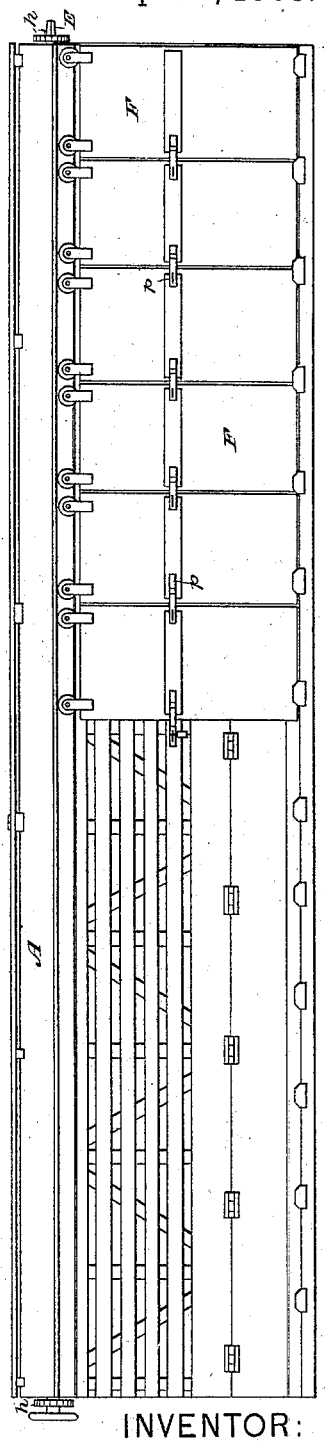
WITNESSES:
E. B. Bolton
Geo. H. Fraser
INVENTOR:
Stephen P. Tallman,
By his Attorneys,
Burke, Fraser & Cornett (No Model.) 2 Sheets—Sheet 2.

S. P. TALLMAN.
STOCK CAR.

No. 274,991. Patented Apr. 3, 1883.

WITNESSES:
E. B. Bolton
Geo. H. Fraser.

INVENTOR:
Stephen P. Tallman
By his Attorneys,
Burke, Fraser Hornett

UNITED STATES PATENT OFFICE.

STEPHEN P. TALLMAN, OF DUNELLEN, NEW JERSEY.

STOCK-CAR.

SPECIFICATION forming part of Letters Patent No. 274,991, dated April 3, 1883.

Application filed December 13, 1882. (No model.)

*To all whom it may concern:*

Be it known that I, STEPHEN P. TALLMAN, a citizen of the United States, residing at Dunellen, in the county of Middlesex and State of New Jersey, have invented certain Improvements in Stock-Cars, of which the following is a specification.

My present invention relates to that class of cattle or stock cars which are designed mainly for transporting horned cattle, being provided with shallow stalls, arranged half on each side of the car and at opposite ends of the same. The animals are separated from each other by partition-gates, and feed-troughs are provided in the stalls. All of the above features are common in such cars.

My car is designed especially, but not necessarily, for the transportation of long-horned wild Texan cattle. In dealing with these animals, and indeed with wild cattle of any kind, it is dangerous to enter the car with them both in loading and unloading, as is necessary in most of the cars as now constructed, in order to close and open the partition-gates, the animals entering the car one at a time. I obviate the necessity of this by constructing one-half the side of the car, opposite to the shallow stalls at that end, as a door or series of doors, which are thrown open from outside, and all of the animals that are to occupy that end of the car are driven in at once and the doors closed behind them. The other side of the car is provided in the same way, and the animals to occupy the other end of the car are driven in from that side. The partition-gates, which separate the animals, are closed when they are driven in, and of course it is only necessary to close the doors in order to properly house or inclose the animals. When the animals are to be unloaded, however, it is necessary that all the gates be opened; and to enable this to be properly done without the necessity of entering the car, I provide means for hoisting them up, either simultaneously or one by one, from the outside, and in order that when hoisted they may close up into a small space, and not hang too low in the car, I construct the gates of horizontal bars arranged to close together when drawn up.

In order that my invention may be the better understood, I will now describe it with reference to the accompanying drawings, wherein—

Figure 5:
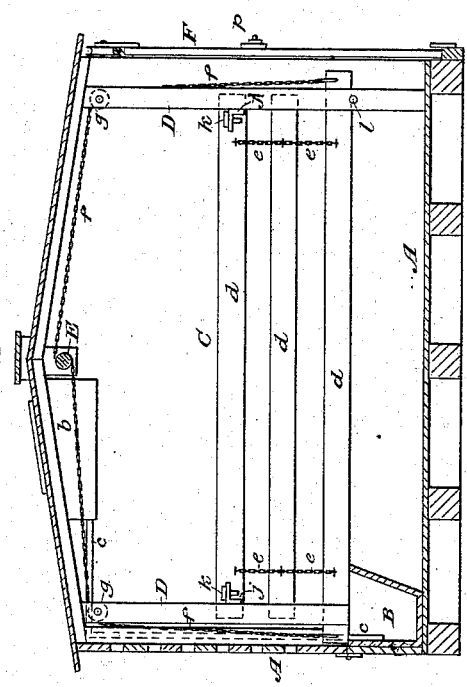
Figure 3:
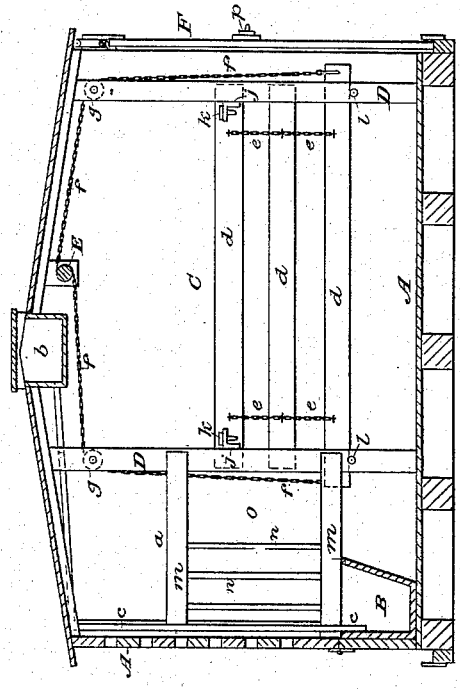
Figure 4:
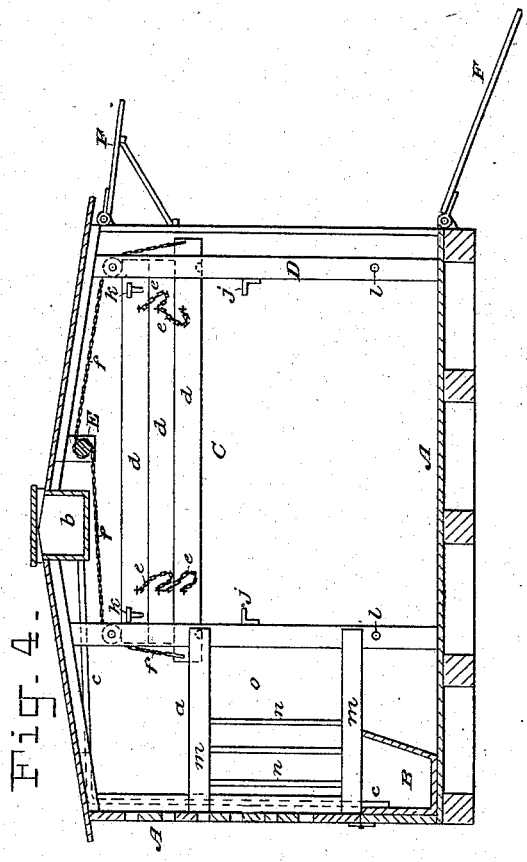

Figure 1 is a plan of the car with the roof removed to show the interior. Fig. 2 is a side elevation of the same; and Fig. 3 is a cross-section of the same, but on a larger scale, taken on the line 3 3 in Fig. 1, and looking in the direction of the arrow. Fig. 4 illustrates a modification in the arrangement of the doors of the car, the interior construction being the same as in Fig. 3. Fig. 5 illustrates another modification, in which the movable gates extend entirely across the car from side to side.

A represents the car-body, which may be constructed in the usual way. This car I have shown divided into twelve stalls; but there may be any number of stalls, according to the length of the car. Six shallow stalls to house the heads of the animals are arranged on each side of the car, and on opposite sides formed by fixed dividing-partitions $a$ $a$.

B B are the water and feed troughs, water to which is supplied by means of a receiver, $b$, in the car-roof, through pipes $c$; and C C are the partition-gates which separate the bodies of the animals when in place in the car.

D D are what I call "twin posts," each being composed of two posts arranged side by side with an interval between them, as shown. These posts are arranged in two series or rows, one series at the ends of the fixed partitions $a$ and the other series opposite to them and near the side of the car. These posts extend from the floor to the roof of the car, and the intervals between their members form slots in which the gates C rest and in which they play up and down. The gates are composed (see Fig. 3) of several bars or slats, $d$ $d$, which are flexibly connected together by chains or cords $e$ $e$. The lower bar of the gate is a little longer than the others, or has projections on its extremities which extend a little beyond the exterior faces of the posts D, and to these are secured chains or ropes $f$ $f$, which pass over sheaves $g$ $g$, between the members of the posts, and thence to a shaft, E, arranged near the roof of the car and lengthwise of the same. This shaft is mounted in suitable bearings, and is provided at its end, where it projects through the end of the car, with a ratchet-wheel, $h$, (see Figs. 1 and 2,) arranged to be engaged by a pawl, $i$, on the car. The shaft may have a hand-wheel on its extremity by which to rotate it, or it may be squared to receive a crank. By turning the shaft E the chains $f$ are wound thereon and the gate lifted. Its position when collapsed and raised to its highest point is shown in Fig. 4. When the gate is lowered it is necessary to provide a stop for the upper slat, in order that it may not descend too far. This may consist of simple cleats secured to the inner faces of the posts D, at the proper points, and a cleat at each end of the top rail to catch on said cleats on the posts; but I prefer to employ a socket-piece, $j$, (see Figs. 3 and 4.) secured to the post and a pin or lug, $k$, secured to the top rail of the gate; or these parts may be reversed in position. This prevents the rail from playing endwise. The lower rail may have notches in its lower edge at the proper points to engage pins $l$, which pass through the posts. This will prevent end play of the lower rail. The intermediate rail or rails cannot have much end play if the top and bottom rails are provided as above described. I might, however, provide all of the rails with cleats on their faces adjacent to the posts to prevent any movement of them endwise. As I prefer to arrange the shaft E over the middles of the gates, it will be seen by reference to Fig. 1 that the arrangement of the fixed stalls, half on each side of the car, renders two such shafts necessary—one for each end of the car—and these shafts are of course not in line. Half of the gates are raised by one shaft and half by the other. Similar means might be provided, however, for raising any one or more of the gates independently of the others.

The fixed partitions $a$, I prefer to construct as shown in Figs. 3 and 4—that is to say, of two strips or bars of wood, $m$, which extend from the side of the car to the post D, and vertical bars $n$, of wood or iron, so arranged as to leave a space at $o$. This permits long-horned cattle to pass their horns through the partition at $o$, yet prevents them from getting their heads through. This is quite important in transporting such cattle, as it is necessary to make the stalls very narrow in order to get as many animals into a car as possible. I prefer to employ a car forty feet long and to divide it up into eighteen stalls.

As before stated, half of each side of the car, but at opposite ends, is arranged to be thrown open. This I accomplish by closing only one half the side of the car permanently and leaving the other half open. This open half I provide with a sliding door or, preferably, several doors, F F, which are arranged to slide along the outer face of the car side in the usual way with car-doors, or in any good way. These doors may be provided with hasps $p$ for securing them together, if desired, but this is not essential. Means should be provided for securing the end one, next the middle of the car, to prevent unauthorized persons from opening the car.

In Fig. 4 I have shown another arrangement of the doors F. In this construction the door is cut, preferably above its middle, and hinged at top and bottom. The lower section is let down and may serve as a gangway for the cattle when they enter the car. The upper half is turned up and propped to stand, as indicated in Fig. 4; or the door might be in one piece and hinged either at top or bottom.

In Fig. 5 I have shown the car unprovided with fixed partitions $a$, and the gates C arranged to extend entirely across the car. This arrangement will serve very well for ordinary short-horned cattle, but the other is preferred for long-horned cattle, as it provides room for their horns.

The operation of loading and unloading is simple. The car is properly placed for loading, the gates C let down, if not already down, and the doors F thrown open. Half the animals are driven into the car from one side and half in from the other side, and the doors are closed and fastened. Feed and water are provided in transit in the usual way. When the car has reached its destination the doors on one side (or both sides, if desired) are thrown open and the gates C raised. The cattle may then be driven out without trouble, and the car be cleaned for the next trip.

It is not absolutely necessary that one-half of the stalls be arranged on each side of the car. There may be more on one side than the other. It is best, however, that one half of the animals shall stand with their heads opposite to those of the other half, and it would not make so strong a car if more than half of one side was made to be thrown open. I might, however, construct a car in which all of one side could be thrown open, by constructing the doors as in Fig. 4, and arrange for the animals to stand with their heads all one way. Such a car would have to be built very strong, however, as the permanent side of a car, which in this construction would be absent on one side, is an important element of strength.

I do not herein claim arranging the stalls half on each side of the car, as shown, nor do I claim the feeding and watering arrangements. These are shown in former patents. Nor do I claim, broadly, a partition for a stock-car composed of flexibly-connected cross-bars, the top bar of which is fixed near the roof of the car and the remaining bars arranged to be drawn up to this bar. My partition-gate is raised and lowered as a whole, and a stop is provided to arrest the top bar at the proper distance above the floor. My gate is also made from wooden slats, which play vertically between the members of twin posts; but What I do claim is—

1. A stock-car divided into stalls by movable partition-gates which separate the animals, and one half of each side of the car, opposite to the rear of the stalls, provided with doors and arranged to be thrown open, as shown, whereby the animals may be driven into the car in a body after the gates are closed, substantially as and for the purposes set forth.

2. A partition-gate for a stock-car comprising flat wooden bars or slats flexibly connected and their ends arranged to play between the members of twin posts set in the car, in combination with said twin posts provided with stops to arrest the descent of the top bar of the gate and stop it at the proper distance above the floor, and the mechanism, substantially as described, for raising and lowering said gate, as set forth.

3. The combination, in a stock-car, with the car-body provided with a door or doors arranged to close one half on each side, and shallow stalls arranged opposite to said door or doors, of the collapsing partition-gates C, the posts D, and the mechanism for hoisting the gates, all constructed and arranged to operate substantially as set forth.

4. A partition-gate for a stock-car, comprising bars or slats $d$ $d$, connected by chains $e$ or other flexible connectors, in combination with the vertical guide, in which the gate plays, provided with socket-pieces $j$ $j$ to arrest the upper slat, the pins or lugs $k$ $k$ on the latter, and the means, substantially as described, for elevating and collapsing the gate, all constructed and arranged to operate substantially as set forth.

5. The combination, with the body A of the car, provided with troughs B, partitions $a$, forming shallow stalls composed of the bars $m$ and $n$, with an opening $o$ for the horns of the animals, and with doors F, of the membered posts D, the gates C, constructed substantially as shown, the hoisting chains or ropes $f$, the shaft E, and the ratchet device, all arranged to operate substantially as set forth.

In testimony whereof I have hereunto signed my name in the presence of two subscribing witnesses.

STEPHEN P. TALLMAN.

Witnesses:
 HENRY CONNETT,
 GEO. BAINTON.